(12) United States Patent
Nitesh

(10) Patent No.: US 9,037,583 B2
(45) Date of Patent: May 19, 2015

(54) GEO TAGGING AND AUTOMATIC GENERATION OF METADATA FOR PHOTOS AND VIDEOS

(76) Inventor: Ratnakar Nitesh, Elkins, WV (US)

( * ) Notice: Subject to any disclaimer, the term of this patent is extended or adjusted under 35 U.S.C. 154(b) by 0 days.

(21) Appl. No.: 12/040,760

(22) Filed: Feb. 29, 2008

(65) Prior Publication Data

US 2009/0222432 A1    Sep. 3, 2009

(51) Int. Cl.
*G06F 17/30* (2006.01)

(52) U.S. Cl.
CPC ............................ *G06F 17/30265* (2013.01)

(58) Field of Classification Search
None
See application file for complete search history.

(56) References Cited

U.S. PATENT DOCUMENTS

| | | | |
|---|---|---|---|
| 7,010,144 B1 * | 3/2006 | Davis et al. | 382/100 |
| 2004/0021780 A1 * | 2/2004 | Kogan | 348/231.3 |
| 2004/0201702 A1 * | 10/2004 | White | 348/207.99 |
| 2005/0060299 A1 * | 3/2005 | Filley et al. | 707/3 |
| 2006/0018506 A1 * | 1/2006 | Rodriguez et al. | 382/100 |
| 2006/0115108 A1 * | 6/2006 | Rodriguez et al. | 382/100 |
| 2007/0050191 A1 * | 3/2007 | Weider et al. | 704/275 |
| 2007/0127833 A1 * | 6/2007 | Singh | 382/254 |
| 2007/0282907 A1 * | 12/2007 | Chambers | 707/104.1 |
| 2008/0020814 A1 * | 1/2008 | Kernene | 463/10 |
| 2008/0033903 A1 * | 2/2008 | Carol et al. | 707/1 |
| 2008/0104099 A1 * | 5/2008 | Walczak et al. | 707/102 |
| 2008/0162561 A1 * | 7/2008 | Naphade et al. | 707/104.1 |
| 2008/0219654 A1 * | 9/2008 | Border et al. | 396/89 |
| 2009/0012995 A1 * | 1/2009 | Sartor et al. | 707/104.1 |
| 2009/0100047 A1 * | 4/2009 | Jones et al. | 707/5 |
| 2009/0136226 A1 * | 5/2009 | Wu et al. | 396/321 |
| 2009/0189811 A1 * | 7/2009 | Tysowski et al. | 342/357.15 |

OTHER PUBLICATIONS

O'Hare et al., "My Digital Photos: Where and When?" To Appear in ACM Multimedia '05, Singapore, Nov. 6-11, 2005.*

* cited by examiner

*Primary Examiner* — Jay Morrison
(74) *Attorney, Agent, or Firm* — Jundong Ma

(57) ABSTRACT

Photo/video is geo tagged with GPS coordinates corresponding to the place of capture of said photo/video. 'Geo-information' metadata corresponding to GPS coordinates is automatically generated and attached to corresponding photo/video. The 'geo-information' metadata comprises of date &time of capture, geo information metadata such as local weather, local attractions, local events etc. at the time of capture of corresponding photo/video. According to another aspect, a search engine is provided with means to crawl through one or more database comprising of 'geo-information' metadata attached to photos/videos and generate result comprising of photos/videos with 'geo-information' metadata corresponding/relevant to query input. According to another aspect, present invention discloses apparatus, means and methods to attach one or more local advertisements to photos/videos and display advertisement in conjunction with corresponding photo/video on communication devices.

18 Claims, 16 Drawing Sheets

GEO TAGGING AND AUTOMATIC GENERATION OF METADATA FOR PHOTOS AND VIDEOS

BACKGROUND AND PRIOR ART

Web-based photo/video search engines allow users to enter keywords into a search box, However, rather than get back Web pages, users are provided related photo/video clips from across the Web. While traditional search engines are skilled at indexing, understanding, and finding text-based content, they are inadequate for finding video content results. They focus only on textual or metadata within web pages rather than looking at actual photo/video files themselves. Photo/Video search engines have emerged to compensate for the weakness of such straight HTML-focused search engines. Today, the field of online photo/video search is rapidly-evolving—an overview of the evolution of photo/video search (from first to second generation) follows.

First Generation Photo/Video Search

First generation video search solutions depended entirely on metadata Including examples are SingingFish, Altavista Video (now used at Yahoo!). These engines are extremely similar to regular web search engines. Just as with a standard web search engine, the spider propagates across the Internet, recording and looking for content to index. Unlike a standard web search engine, text documents and pages are ignored and the spider focuses instead only on photo/video (and sometimes audio) content. Once such content types are discovered they are examined for relevant metadata Metadata is the textual data that is applied to a piece of multimedia content in order to describe it and can include user-provided tags, an editorially written title or summary, a transcript of the speech in the video or even information stored in the video file itself pertaining to its resolution, frame-rate and creation date. Still part of the first generation, but much improved, display-oriented spidering has been used to great effect in video search. First developed for the closely related problem of video and photo search, display-oriented spidering looks at the web page text that lies near a photo/video. Using a specialized algorithm, display-spidering evaluates the physical attributes of the way the page is designed and rendered to decide which portions of it are closely related or linked to the photo/video. It then extracts the text within these areas and applies them, as further metadata, to the photos/videos being indexed. As many web pages contain commentary or description that is related to the photo/video but may not be contained in the official metadata, this approach can provide more detail on the meaning of the photo/video being spidered. The best example of display-oriented spidering for photo/video search today is that found at AOL's Search video.com. However, whether augmented with display-oriented analysis or not, the methodology of first-generation, metadata spidering is still flawed because the engines still rely heavily upon the quality of the metadata that has been provided. As the metadata is often provided as an afterthought, it may be incomplete or lacking in detail and, as it is provided by the owner or publisher of the photo/video, may even be false or misleading. First generation photo/video search is a reasonable solution that borrows on existing web search technology to simplify the photo/video search problem. By doing so, however, it limits itself to never actually understand an actual photo/video, but rather focusing only on pieces of text that may be related to the photo/video but are, fundamentally, of second order to it.

Second Generation Photo/Video Search

Second generation photo/video search engines emerged as a reaction to the faults of the first generation. As well as spidering textual metadata, second generation photo/video search aims to understand and extract meaning from the photo/video itself. Second generation photo/video search engines use methods such as speech recognition, visual analysis and recognition and photo/video optical character recognition to allow software to listen to, watch and read the text appearing on the photo/video content itself. As well as providing more information, this approach provides objective information—if a photo/video contains speech on a particular topic, it really is about that topic, whereas if a photo/video has been tagged as pertaining to a certain topic, it may, actually be about something entirely different. Second generation photo/video search is still primarily used in government and enterprise settings. Blinkx and Podzinger exist as example of technologies that have been applied to general, consumer Web photo/video search. Podzinger, as the name suggests, focuses more of audio and photo/video podcasts, while Blinkx indexes all audio and video content on the Web, whether amateur or professional. Regardless of the technology involved, both first and second generation photo/video search engines exist and are popular today.

As discussed above, both first and second generation photo/video search engines consider metadata. In the case of first generation photo/video search engines, in fact, this may be the only information by which your photo/video is judged. As such, it is imperative to provide well-placed, rich and relevant metadata that can be easily located by search engines. In photo/video sharing or hosting system such as YouTube, users are generally given the opportunity to provide metadata (and are strongly encouraged to do). Unfortunately, many photo/video sharing sites (YouTube in particular) suffer from prevalent metadata abuse problems where enterprising Photo/video SEO practitioners pollute their photo/video metadata and list tens, sometimes a hundred, popular search terms that are irrelevant to the photo/video itself. This deceptive practice can easily be observed by typing such a search term into any popular photo/video sharing site. While this is, at the moment, a somewhat successful strategy, it has two significant weaknesses. Firstly, it brings SEO and an SEO professional's target or client into disrepute. If a user's search brings back irrelevant photo/video, it is unlikely that that user will confer any positive impression of the content or brand associated. Secondly, as this problem grows, search engines are already working to combat it. Blinkx, for example, now employs a number of Bayesian-based methods to screen for such metadata abuse resulting in severe de-prioritization of such content.

There remains a need for means methods and apparatus to enable automatic generation of metadata for photos/videos that accurately represent the spirit of corresponding photo/video. Lately many image capturing devices are entering the market with inbuilt or add on GPS receiver. Such devices have means to 'geo-tag' photos/videos captured by them. Geo-tagging, is the process of adding geographical identification metadata to various images/photo/video and is a form of geospatial metadata. This data usually consists of latitude and longitude coordinates, though it can also include altitude, bearing, and place names. Geo-tagging can help users find a wide variety of location-specific information. For instance, one can find images taken near a given location by entering latitude and longitude coordinates into a Geo-tagging enabled image search engine. For example, Flickr, Yahoo Inc's online photo-sharing site has a set of mapping features that makes it easier to find photos based on their location. Flickr enables Web users to browse photos from tens of millions of geographically located photos loaded up to its site, http://www.flickr.com/. The service, called "Places," identifies on a global map the latest hot-spots for photo contributions. Flickr Places also allows users to search by more than 100,000 geographic place names to find photos that might interest them. Many of the world's cities as well as states, countries and regions have their own featured pages. The global map view lets Flickr users see the latest photos by theme. Clicking on a category tag takes users to a selection of photos, giving them a glimpse of what other Flickr users collectively find interesting or newsworthy.

SUMMARY

Photo/video is geo tagged with GPS coordinates corresponding to the place of capture of said photo/video. 'Geo-information' metadata corresponding to GPS coordinates is automatically generated and attached to corresponding photo/video. The 'geo-information' metadata comprises of date &time of capture, local information such as local weather, local attractions, local events etc. at the time of capture of corresponding photo/video. According to another aspect, a search engine is provided with means to crawl through one or more database comprising of 'geo-information' metadata attached to photos/videos and generate result comprising of photos/videos with 'geo-information' metadata corresponding/relevant to query input. According to another aspect, present invention discloses apparatus, means and methods to attach one or more local advertisements to photos/videos and display advertisement in conjunction with corresponding photo/video on communication devices.

DETAIL DESCRIPTION OF THE INVENTION

Figure 1:
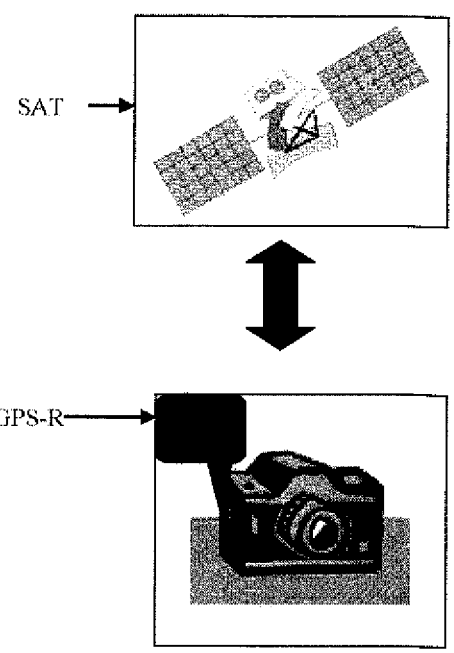
FIG. 1 shows an image capturing device with a GPS receiver in communication with a GPS satellite.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out one or several purposes of the present invention. It is important, therefore, that the claims be regarded as including such equivalent constructions insofar as they do not depart from the spirit and scope of the present invention.

Figure 3A:
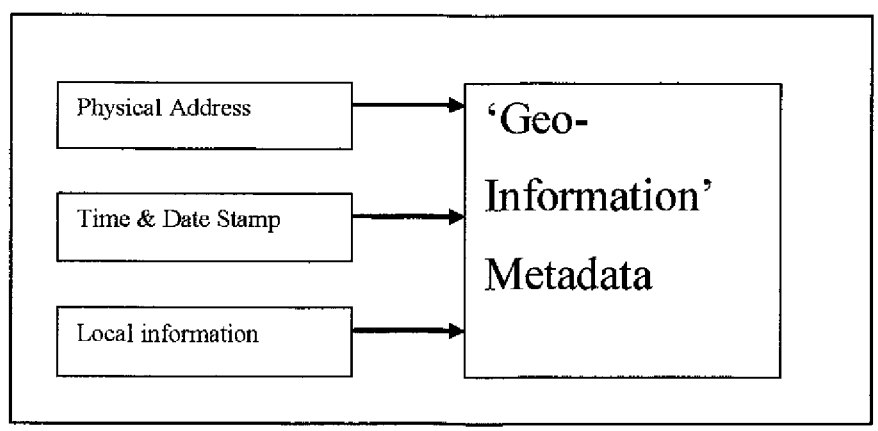
FIG. 3A shows the preferred composition of 'geo-information' metadata.

As shown in FIG. 1, GPS receiver (GPS-R) is provided in image capturing devices such as digital camera, digital camcorder etc. When photo/video is recorded into the internal/external memory of image capturing device; it is geo tagged with GPS coordinates corresponding to the location where photo/video was captured. When photo/video is transferred from one device to second, the corresponding 'geo-tag' is transferred as well. Alternatively, photo and video can be geo tagged after thief capture at a later time, such as by superimposing them on a map. Additionally, means is provided to tag photo/video with 'geo-information' metadata corresponding to GPS coordinates contained in its 'geo-tag'. As shown in FIG. 3A, 'geo-information' metadata preferably includes physical address corresponding to the GPS coordinates, time &date stamp and local information such as local attractions, local weather conditions at the time picture/video was captured, local events at the time picture/video was captured, or any other pertinent local information. Physical address corresponding to a GPS coordinate is obtained by the process of 'geo coding' whereby physical address corresponding to GPS coordinates is generated. Such database can be obtained from many existing third party vendors. The method to stamp photos/video with time and date exists and prior art and is present in many existing image capturing devices.

Figure 3B:
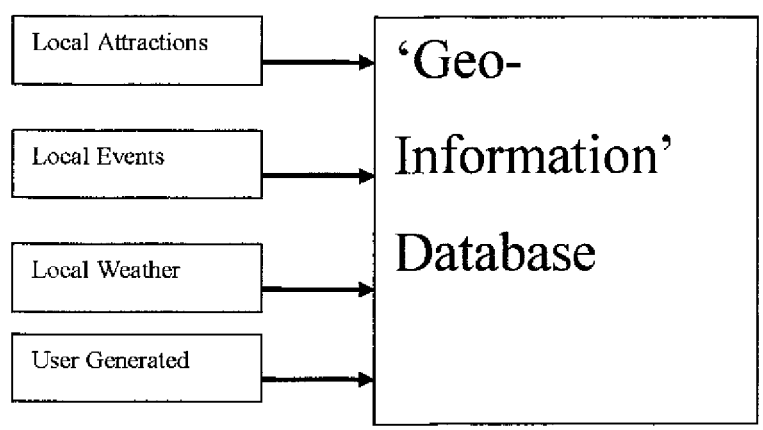
FIG. 3B shows the preferred composition of 'geo-information' database.

A 'geo-information' database is provided comprising of 'Geo-information' metadata with corresponding GPS coordinates. 'Geo-information' database is preferably a collection a sub databases, as shown in FIG. 3B, each sub database comprising one aspect of the 'geo-information' database. The sub databases can be generated in house or can be obtained from third party vendors. For example, as shown in FIG. 3B, a sub database contains local attractions data with corresponding GPS coordinates and a second database, contains local events data with corresponding GPS coordinates & time. Additionally, means is provide for end users to generate metadata corresponding to GPS coordinates/physical addresses and input into the 'geo-information' database.

Figure 2:
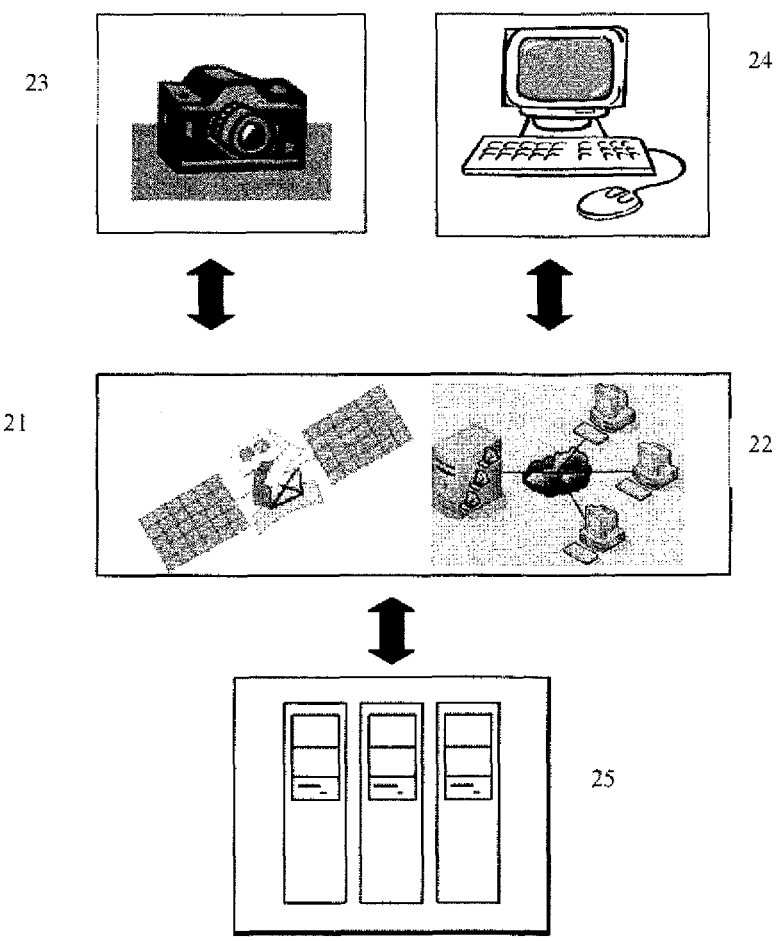
FIG. 2 illustrates the means, time and place where 'geo-tag' and 'geo-information' metadata are attached to photos/videos.

As shown in FIG. 2 'Geo-information' database is saved in GPS satellites (21) and/or web server (22). According to one method, 'geo-information' metadata is attached to photo/video at the time photo/video is geo tagged with GPS coordinates at the level of image capturing device (23). Means is provided in image capturing device to synchronize photo/video database contained therein with corresponding 'geo-information' database contained in GPS satellite (21) or web server (22). According to another method, 'geo-information' metadata is attached to photo/video when photo/video is uploaded onto personal computer (24). Means is provided in personal computer (24) to synchronize photo/video database contained therein with corresponding 'geo-information' database contained in GPS satellite (21) or web server (22). According to yet another method, 'geo-information' metadata is attached to photo/video when photo/video is uploaded onto web server (25). Means is provided in web server (25) to synchronize photo/video database contained therein with corresponding 'geo-information' database contained in GPS satellite (21) or web server (22).

According to one aspect of the invention, search engine with means to crawl through 'geo-information' metadata saved on one or more server is provided. In an offline environment, such as collection of photos/videos on a personal computer or a local network, search engine crawls thorough 'geo-information' metadata attached to photos/videos saved on the personal computer or local network and search for 'geo-information' metadata relevant/corresponding to query input. In an online environment, 'geo-information' metadata is uploaded onto one or more web server when corresponding photo/video is uploaded. Search engine crawls thorough 'geo-information' metadata attached to photos/videos saved on one or more web servers and generate result based on 'geo-information' metadata relevant/corresponding to query input. Photos/videos contained in search result generated in response to query is sorted according to the relevancy of 'geo-information' metadata to query input. According to another method, photos/videos contained in result generated in response to query, is sorted according to time of capture.

Figure 4A:
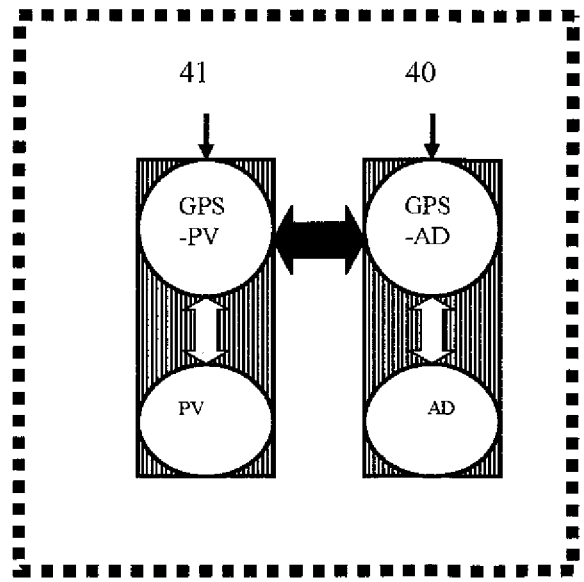
FIGS. 4A, 4B & 4C show means, methods and apparatus to attach one or more advertisements to 'geo-tagged' photos/videos according to GPS coordinates of photo/video; and subsequently transmit them to one or more communication devices.
Figure 4B:
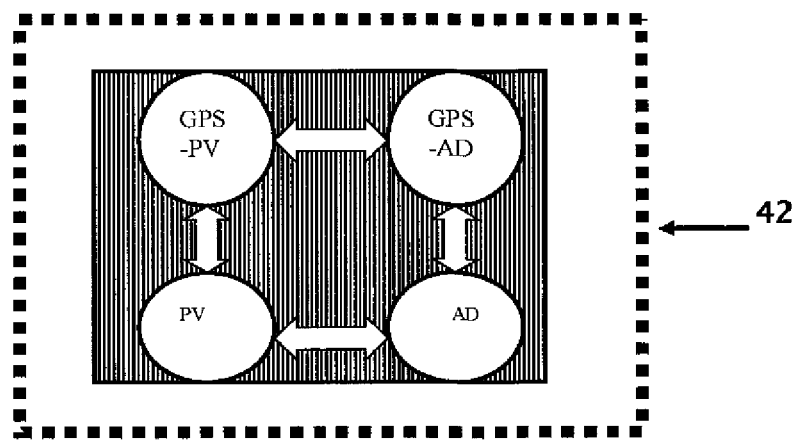
Figure 4C:
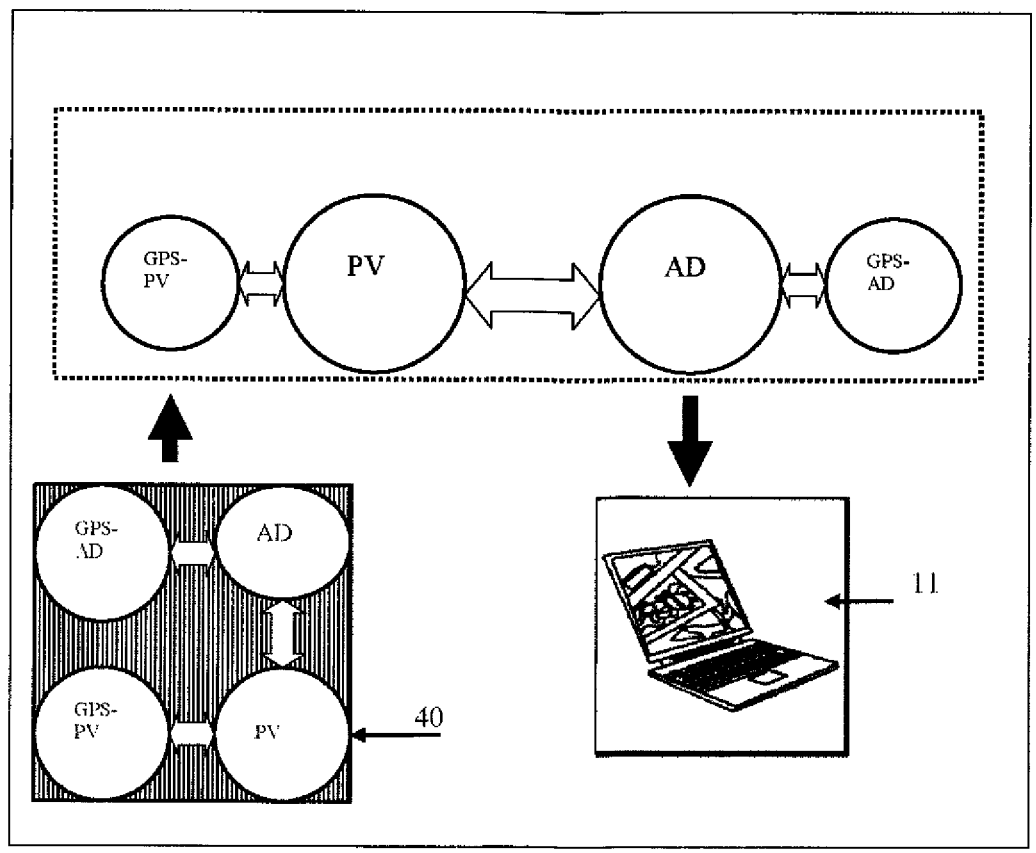

According to yet another aspect of the invention, one or more advertisement is paired with photo/video contained in search result generated in response to query. Advertisement may contain one or more of text, audio, image or video content. According to one method shown in FIGS. 4A, 4B & 4C 'central advertisement database' (40) is provided which contains one or more advertisements (AD) saved in a web server. Means is provided to geo tag advertisements (AD) in the 'central advertisement database' (40). Preferably advertisements are geo tagged according to location of corresponding business. Alternatively, advertisements are geo tagged with target GPS coordinates, whereby target GPS coordinates identify geo tag of photos/videos to which attachment of advertisement is desired. Means is provided to synchronize information contained in one or more web server containing 'central advertisement database' (40) and one or more web servers containing 'geo-tagged' photos/videos database (41). As shown in FIG. 4B one or more advertisement (AD) is attached to photo/video (PV) tagged with GPS coordinates/physical address (GPS-PV) corresponding to target GPS coordinates/physical address (GPS-AD) attached to advertisement (AD). This results in a combined photo/video (PV) and advertisement (AD) database (42) which also contains the GPS coordinates corresponding to photo/video (GPS-PV) and advertisement (GPS-AD). As shown in FIG. 4C, when photo/video (PV) is transmitted from web server to one or more communication device such as personal computer (11) advertisement (AD) attached there to is transmitted as well. The advertisement (AD) is displayed along with corresponding photo/video (PV). An advantage of this method is that it enables local businesses to advertise in conjunction with photos/videos taken in their geographic location; hence targeting local population or visitors who are more likely to do business with them.

Figure 5A:
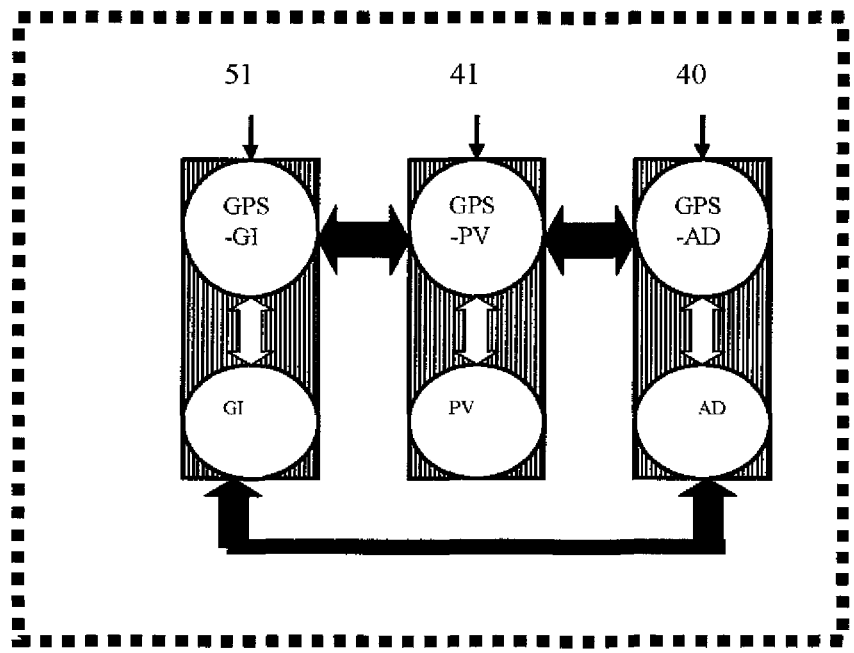
FIGS. 5A, 5B & 5C show means, methods and apparatus to attach one or more advertisements to 'geo-tagged' photos/videos according to GPS coordinates and 'geo-information' metadata of photo/video; and subsequently transmit them to one or more communication devices.
Figure 5B:
Figure 5B:
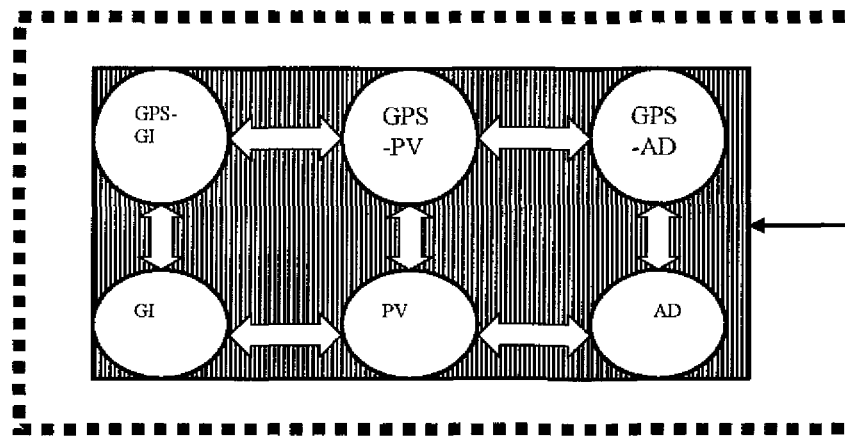
Figure 5C:
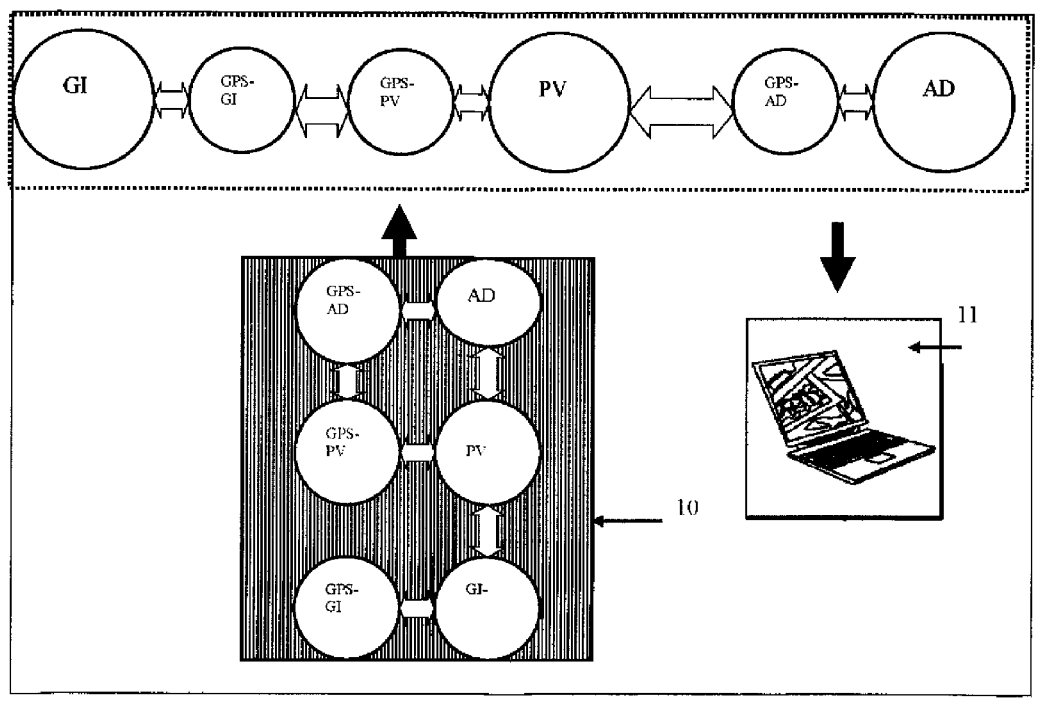

According to another method, in addition to GPS coordinates, advertisements are paired with photo/video based on content of 'geo-information' metadata as shown in FIGS. 5A, 5B & 5C. Example, advertisement for 'XYZ Firewood Inc.' (AD) is attached to photos/videos (PV) with UPS coordinates (UPS-PV) corresponding to location of 'XYZ Firewood Inc.' (GPS-AD); and additionally only to photos with 'geo-information' metadata—'winter' (GI). As shown in FIG. 5C, when photo/video (PV) is transmitted from web server to one or more communication device such as personal computer (11) advertisement (AD) attached there to is transmitted as well. The advertisement (AD) is displayed along with corresponding photo/video (PV). In the illustrated example, advertisement for 'XYZ Firewood Inc.' is displayed when corresponding photo/video is displayed on personal computer (11). As is evident in the illustrated example, the invention provides powerful tool for 'XYZ Firewood Inc.' to display their advertisement to users viewing photos/videos from same geographic area as 'XYZ Firewood Inc.'; and additionally to users viewing photo/video taken during winter season, which is pertinent to firewood business of 'XYZ Firewood Inc.'.

Figure 6A:
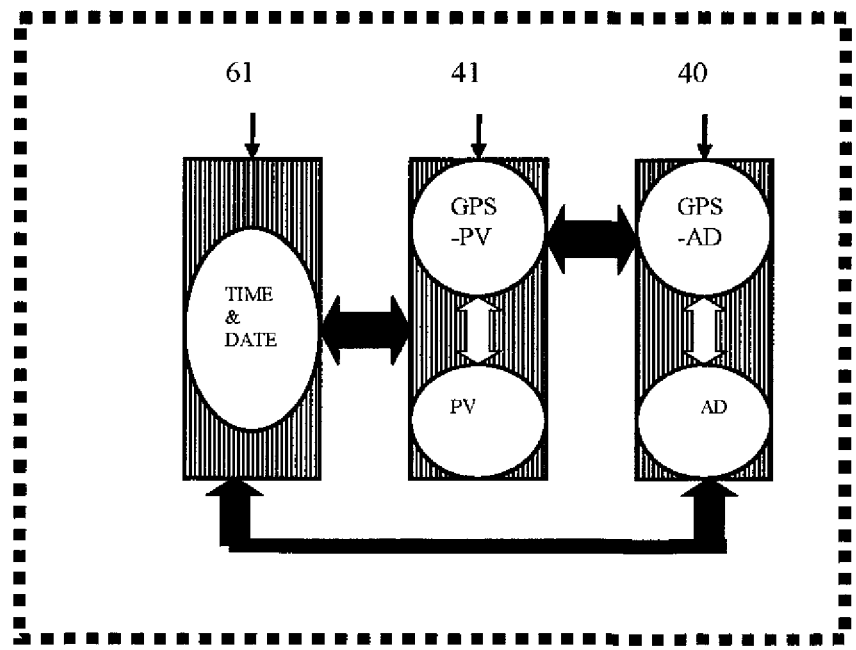
FIGS. 6A, 6B & 6C show means, methods and apparatus to attach one or more advertisements to 'geo-tagged' photos/videos according to GPS coordinates and time &date stamp of photo/video; and subsequently transmit them to one or more communication devices.
Figure 6B:
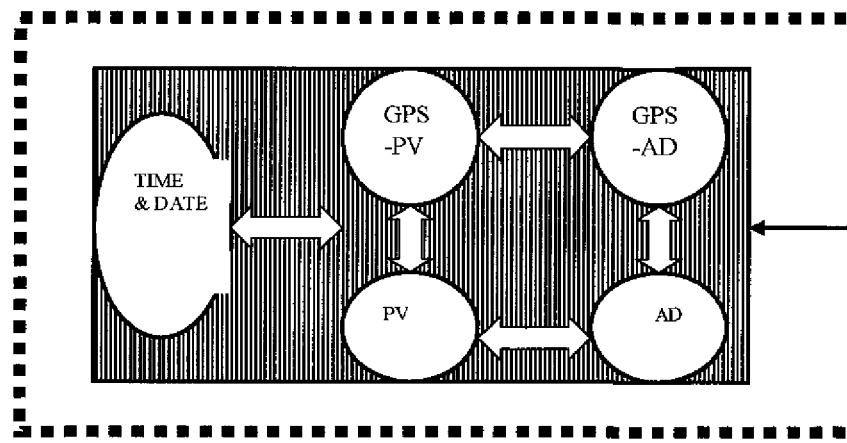
Figure 6C:
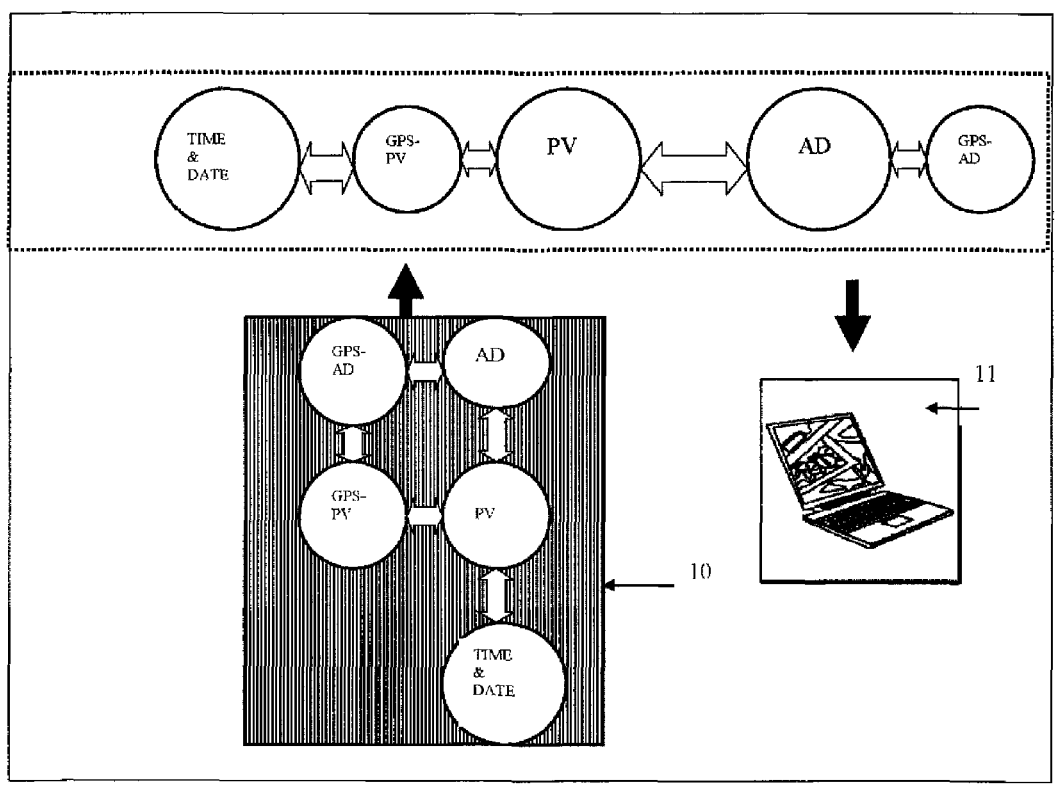

According to another method, in addition to GPS coordinates, advertisements are paired with photo/video based on time & date stamp (61) of photo/video, as shown in FIGS. 6A, 6B & 6C. Example, advertisement for 'XYZ Firewood Inc.' (AD) is attached to photos/videos (PV) with GPS coordinates (GPS-PV) corresponding to location of 'XYZ Firewood Inc.' (GPS-AD) and additionally only to photos/videos with time & date stamp (61) between Dec. 1, 2007 and Feb. 28, 2008. As shown in FIG. 6C, when photo/video (PV) is transmitted from web server to one or more communication device such as personal computer (11) advertisement (AD) attached there to is transmitted as well. The advertisement (AD) is displayed on personal computer (11) when corresponding photo/video (PV) is displayed. In the illustrated example, when photo/video (PV) attached to advertisement for 'XYZ Firewood Inc.' is displayed on personal computer (11), advertisement of 'XYZ Firewood Inc.' (AD) is displayed along with. In the illustrated example, the invention provides powerful tool for 'XYZ Firewood Inc.' to display their advertisement (AD) to users viewing a photo Ivideo (PV) from same geographic area (GPS-PV) as 'XYZ Firewood Inc.' (GPS-AD); additionally only to users viewing photo/video (PV) taken between Dec. 1, 2007 and Feb. 28, 2008; which is pertinent to firewood business of 'XYZ Firewood Inc.' (AD).

Figure 7A:
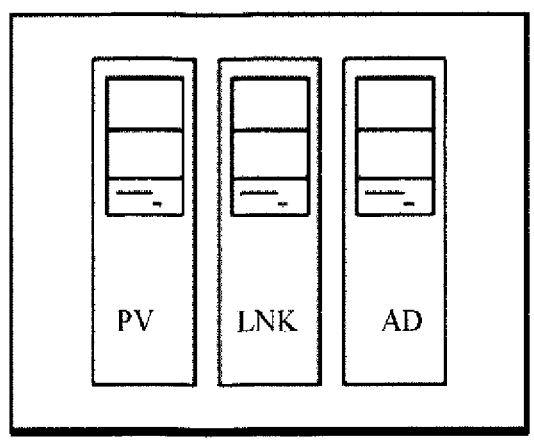
FIGS. 7A, 7B, 7C & 7D show means, methods and apparatus to attach one or more advertisements to 'geo-tagged' photos/videos by means of a link, means to retrieve advertisements from remote web server and transmit to communication devices, and means to display advertisement in conjunction with corresponding photo/video in communication device.
Figure 7B:
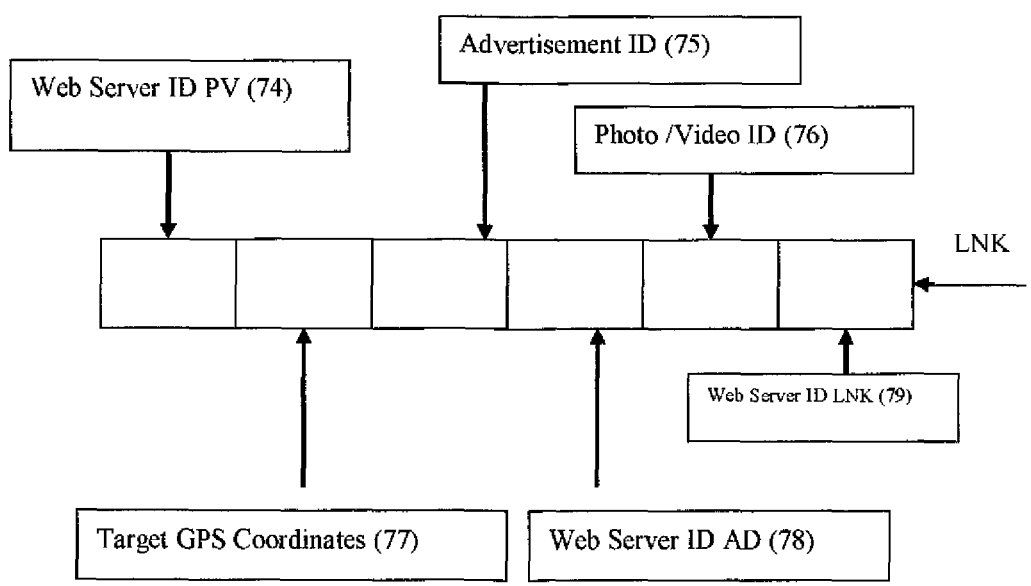
Figure 7C:
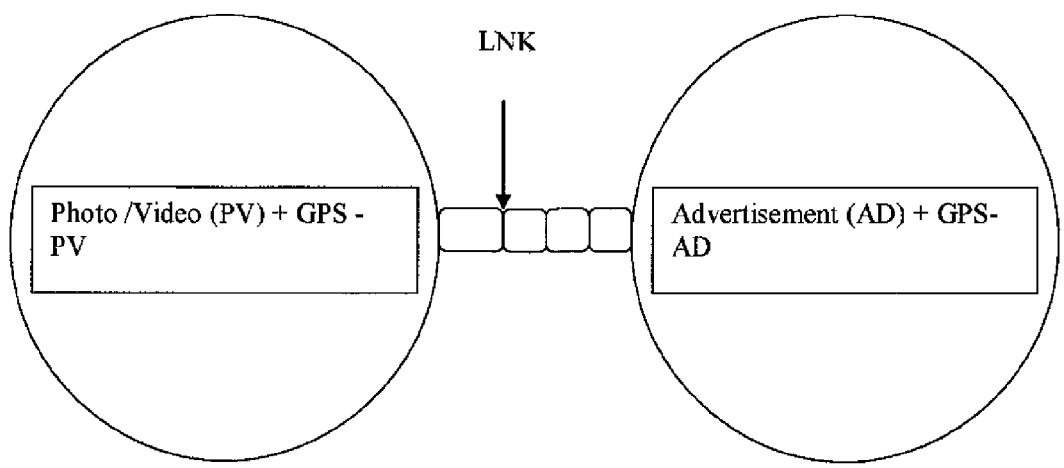
Figure 7D:
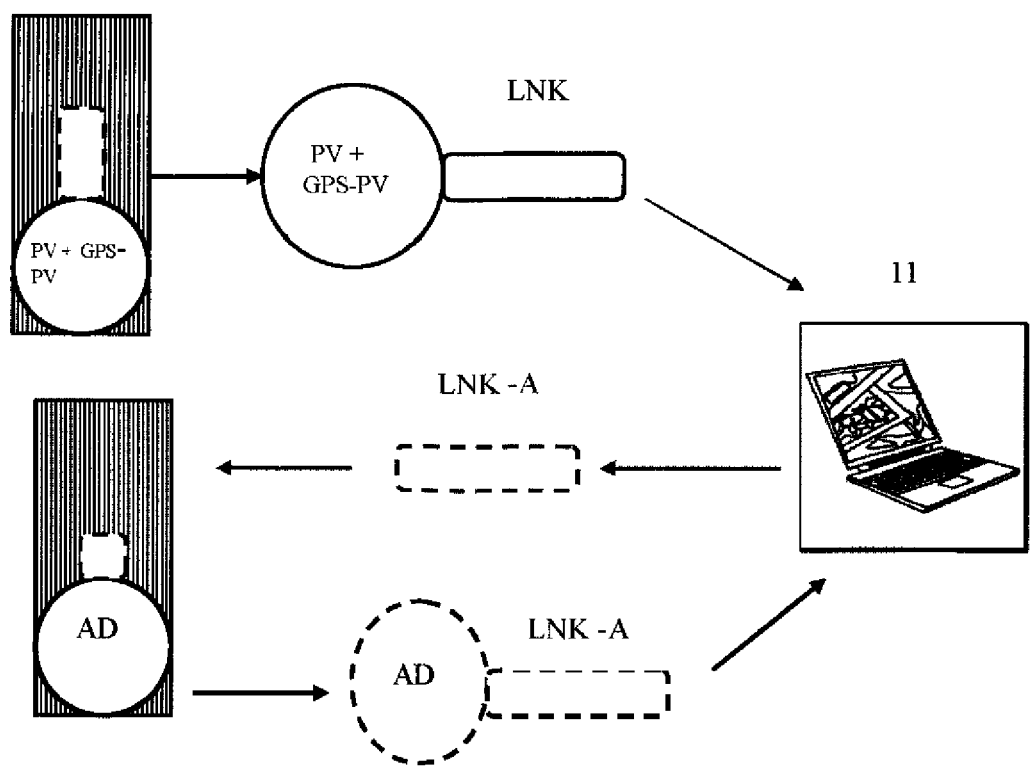

In the methods discussed above, advertisement is saved with corresponding photo/video in communication device and consequently large memory capacity is required. According to another method, as shown in FIGS. 7A, 78 & 7C, 7D, one or more advertisements (AD) is paired with 'geo-tagged' photo/video (PV) saved in one or more independent web servers by means of a 'link' (LNK). Preferably, Links (LNK), geo-tagged photos/videos (PV) and advertisements (AD) are saved in independent web servers, as shown in FIG. 7A. FIG. 7B shows details of the 'link (LNK)'. The 'link (LNK)' comprises of, 1) ID of corresponding advertisement (75); 2) ID of web server where corresponding advertisement is saved (78); 3) target GPS coordinates/physical address (77); and 4) ID of web server where 'link' is saved (79). Link (LNK) is transmitted to one or more web server containing geo tagged photos/videos where is paired with photos/videos containing GPS coordinates/physical address corresponding to target GPS coordinates/physical address of the link (LNK) as shown in FIG. 7C. Additionally, photo/video ID can be incorporated into the link (76) to enable link (LNK) to pair with specific photo/video. Once paired with a 'geo-tagged' photo/video, photo/video ID (76), photo/video web server ID (74) is integrated into the link (LNK) as shown in FIG. 7A. Alternatively, photo/video web server ID (74) can be added to the link (LNK) at the level of link web server; where after the link (LNK) is transmitted to corresponding photo/video web server. In addition to the target GPS coordinates, link (LNK) may also contain additional target parameters such as target 'geo-information' metadata which enables link (LNK) pair with ic photo/video containing corresponding GPS coordinates and 'geo-information' metadata. As shown in FIG. 7D when photo/video (PV) is transmitted from web server (10) to personal computer (11) in response to query, attached 'link' (LNK) is transmitted as well. Means is provided to incorporate ID of personal computer (11) into the link (LNK). The link (LNK) is activated (LNK-A) when corresponding photo/video is displayed on the personal computer (11). Active link (LNK-A) is transmitted to web server where corresponding advertisement (AD) is saved (FIG. 7A). Web server ID (78) contained in the link (LNK) guides the active link (LNK-A) to corresponding web server. Once in web server, advertisement ID (75) contained in the active link (LNK-A) is used to retrieve and attach corresponding advertisement (AD) to active link (LNK-A); following which advertisement (AD) and active link (LNK-A) is transmitted back to the personal computer (11). Personal computer ID contained in the active link (LNK-A) is used to direct advertisement (AD) and active link (LNK-A) back to personal computer (11) where active link (LNK-A) originated. Means is provided in personal computer to display advertisement (AD) attached to active link (LNK-A). Advertisement is preferably displayed on personal computer when corresponding photo/video is displayed. Although this method can work without saving advertisement in personal computer, preferably means is provided in personal computer to save advertisement (AD) attached to active link (LNK-A).

Figure 8A:
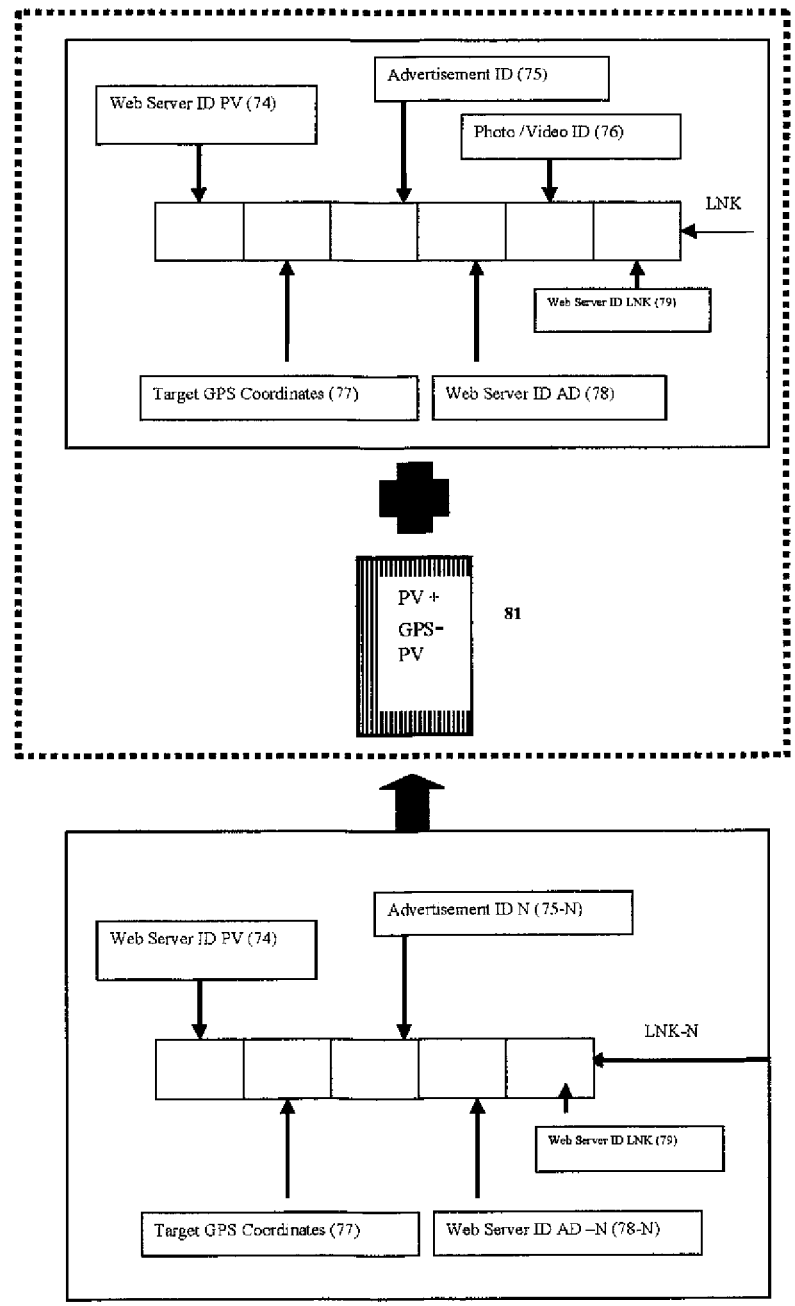
FIGS. 8A & 8B show means, methods and apparatus to replace old link attached to photo/video with new link corresponding to new advertisement.
Figure 8B:
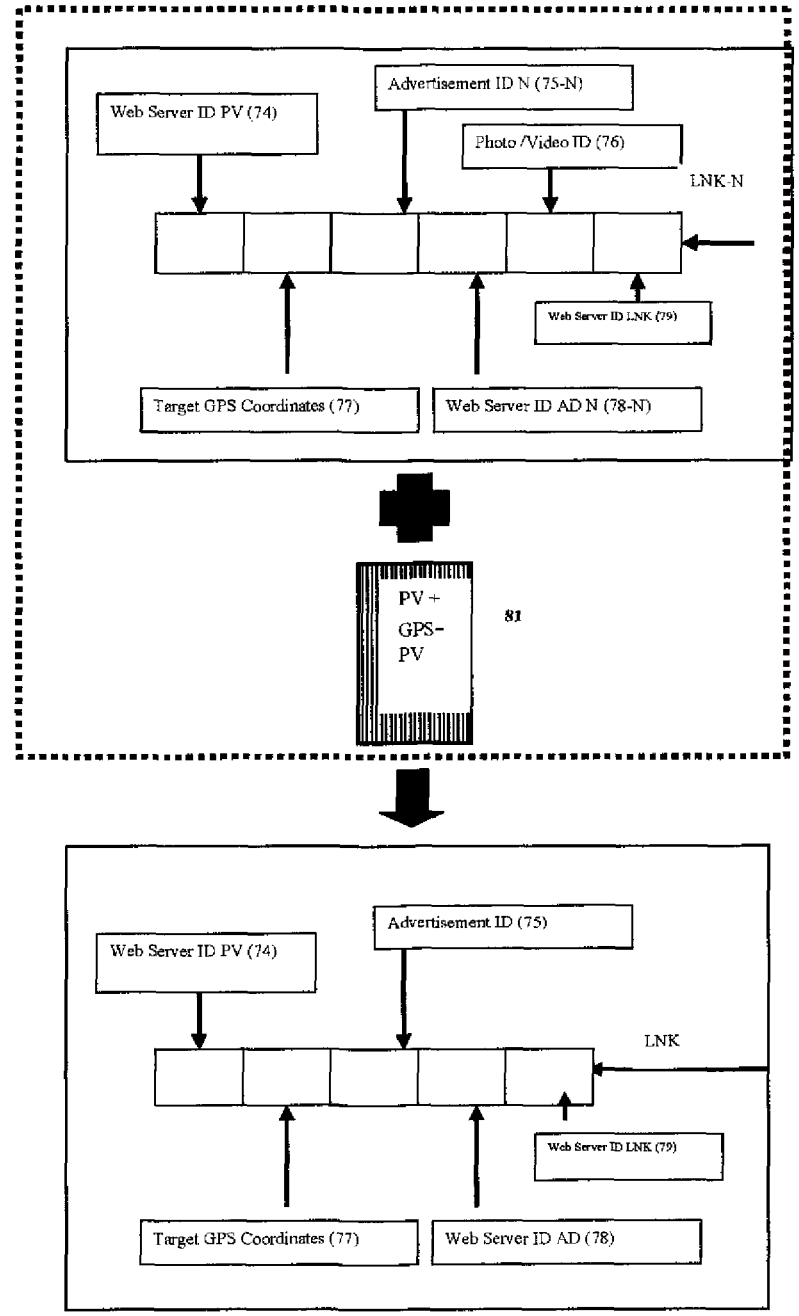

One advantage of the method showed in FIGS. 7A, 7B, 7C & 7D is that it provides means to seamlessly pair new advertisements with existing photos/videos as shown in FIGS. 8A & 8B. New link (LNK-N) with new advertisement ID (75-N) and new advertisement web server ID (78-N) is created. The new link (LNK-N) maintains same target GPS coordinates/physical address (77) and photo/video web server ID (74; if applicable) as the old link (LNK). Means is provided in photo/video web server (81) to attach new link (LNK-N) to corresponding photo/video while replacing the old link (LNK) from said photo/video.

The methods and means of the present invention is useful in that is enables automatic generation of metadata for picture/video in an objective and unbiased way with minimal human intervention. Moreover, the 'geo-information' metadata generated by means of present invention are the criteria most commonly used by users to search for photos/videos both in an offline and online environment. This feature overcomes a major flaw of present metadata spidering because the engines still rely heavily upon the quality of the metadata that has been provided. As the metadata is often provided as an afterthought, it may be incomplete or lacking in detail and, as it is provided by the owner or publisher of the video, may even be false or misleading. Moreover recorded metadata includes information that is most commonly used by users to search photo/video both in an offline and online environment. The metadata generated using teachings of present invention accurately reflects the, content and spirit of corresponding picture/video.

Means is provided to update the 'goo-information' metadata as new 'geo-information' metadata is generated. Updated 'geo-information' metadata corresponding to one or more GPS coordinates is uploaded onto a web server or GPS satellite. The updated 'geo-information' metadata replaces the older 'geo-information' metadata of corresponding GPS coordinate. The updated 'geo-information' metadata is uploaded onto communication devices when said devices synchronize with the web server/GPS satellite containing updated 'geo-information' metadata. This feature enables 'geo-information' metadata attached to photo/video to stay current.

The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out one or several purposes of the present invention. It is important, therefore, that the claims be regarded as including such equivalent constructions insofar as they do not depart from the spirit and scope of the present invention. Some variations of the invention may include: 1) In addition to photo/video audio files may be used; 2) in addition to personal computer, other communication devices may be used. The above list is for illustration purposes only and should in no way be considered all inclusive or limiting.

I claim:

1. A method of attaching objective and accurate metadata to a plurality of geo-tagged images previously captured by an image capturing device and stored in a personal communication device through one or more synchronizing operations, the personal communication device communicable to a geo-information database, each of the plurality of geo-tagged images comprising an original image and a first set of metadata including a set of tagged GPS coordinates corresponding to a geographical location where the original image is captured, the geo-information database configured to store, for each of a plurality of geographical locations corresponding to one or more sets of GPS coordinates, a collection of data for information local to the geographical location, the method comprising:

retrieving, during a first synchronization operation, by the personal communication device, for each geo-tagged image of the plurality of geo-tagged images, from the geo-information database, a group of local data using the set of tagged GPS coordinates of the geo-tagged image included in the first set of metadata of the geo-tagged image, the retrieved group of local data including data for information local to a geographical location corresponding to the set of tagged GPS coordinates of the geo-tagged image;

generating, during the first synchronization operation, by the personal communication device, for each geo-tagged image of the plurality of geo-tagged images, a second set of metadata of the geo-tagged image including the retrieved group of local data for the geo-tagged image, and attaching, by the personal communication device, the second set of metadata to the original image of the geo-tagged image;

retrieving, during a second synchronization operation, by the personal communication device, for each geo-tagged image of the plurality of geo-tagged images, from the geo-information database, a group of updated local data using the set of tagged GPS coordinates of the geo-tagged image, the retrieved group of updated local data including data for updated information local to a geographical location corresponding to the set of tagged GPS coordinates of the geo-tagged image; and generating, during the second synchronization operation, by the personal communication device, for each geo-tagged image of the plurality of geo-tagged images, an updated second set of metadata for the geo-tagged image including the retrieved group of updated local data for the geo-tagged image, and attaching, by the personal communication device, the updated second set of metadata for the geo-tagged image to the original image of the geo-tagged image.

2. The method of claim 1, wherein the first set of metadata of a geo-tagged image of the plurality of geo-tagged images contains a stamp of a time and date at which the original image of the geo-tagged image was captured.

3. The method of claim 2, wherein the retrieved group of local data for the geo-tagged image includes information on local weather corresponding to the set of tagged GPS coordinates and the time and date stamp of the geo-tagged image.

4. The method of claim 1, the retrieved group of local data for a geo-tagged image of the plurality of geo-tagged images comprises information on a physical address corresponding to the set of tagged GPS coordinates of the geo-tagged image.

5. The method of claim 1, wherein the retrieved group of local data for a geo-tagged image of the plurality of geo-tagged images comprises information on one or more local events corresponding to the set of tagged GPS coordinates of the geo-tagged image.

6. The method of claim 1, wherein the retrieved group of local data for a geo-tagged image of the plurality of geo-tagged images comprises information on local attractions corresponding to the set of tagged GPS coordinates of the geo-tagged image.

7. The method of claim 1, wherein the geo-information database is included in one or more GPS satellites through which the set of tagged GPS coordinates of a geo-tagged image of the plurality of geo-tagged image is acquired.

8. The method of claim 1, wherein the geo-information database is resided in at least a server remote from the personal communication device.

9. The method of claim 1, further comprising:
storing the second set of metadata for a geo-tagged image of the plurality of geo-tagged images into an image-metadata database as image metadata attached to the original image of the geo-tagged image.

10. The method of claim 1, wherein the personal communication device comprises the image capturing device.

11. A personal communication device for attaching objective and accurate metadata to a plurality of geo-tagged images previously captured by an image capturing device and stored in the personal communication device using a geo-information database, each geo-tagged image of the plurality of geo-tagged images comprises an original image and a first set of metadata including a set of tagged GPS coordinates corresponding to a geographical location where the original image is captured, the personal communication device communicable to the geo-information database, the geo-information database configured to store, for each of a plurality of geographical locations corresponding to one or more sets of GPS coordinates, a collection of data for information local to the geographical location, the personal communication device comprising:
a processor; and
a system memory, said system memory storing a plurality of software modules configured to perform, when executed by the processor, a set of steps comprising:
retrieving, during a first synchronization operation, for each geo-tagged image of the plurality of geo-tagged images, from the geo-information database, a group of local data using the set of tagged GPS coordinates of the geo-tagged image included in the first set of metadata of the geo-tagged image, the retrieved group of local data including data for information local to a geographical location corresponding to the set of tagged GPS coordinates of the geo-tagged image;
generating, during the first synchronization operation, for each geo-tagged image of the plurality of geo-tagged images, a second set of metadata including the retrieved group of local data for the geo-tagged image, and attaching the second set of metadata to the original image of the geo-tagged image;
retrieving, during a second synchronization operation, for each geo-tagged image of the plurality of geo-tagged images, from the geo-information database, a group of updated local data using the set of tagged GPS coordinates of the geo-tagged image, the retrieved group of updated local data including data for updated information local to a geographical location corresponding to the set of tagged GPS coordinates of the geo-tagged image; and
generating, during the second synchronization operation, for each geo-tagged image of the plurality of geo-tagged images, an updated second set of metadata for the geo-tagged image including the retrieved group of updated local data for the geo-tagged image, and attaching the updated second set of metadata for the geo-tagged image to the original image of the geo-tagged image.

12. The personal communication device of claim 11, wherein the first set of metadata of a geo-tagged image of the plurality of geo-tagged images contains a stamp of a time and date at which the original image of the geo-tagged image was captured.

13. The personal communication device of claim 12, wherein the retrieved group of local data for the geo-tagged image includes information on local weather corresponding to the set of tagged GPS coordinates and the time and date stamp of the geo-tagged image.

14. The personal communication device of claim 11, wherein the retrieved group of local data for a geo-tagged image of the plurality of the geo-tagged images comprises information about a physical address corresponding to the set of tagged GPS coordinates of the geo-tagged images.

15. The personal communication device of claim 11, wherein the retrieved group of local data for a geo-tagged image of the plurality of geo-tagged images includes information on one or more local events corresponding to the set of tagged GPS coordinates of the geo-tagged image at the time and date at which the original image of the geo-tagged image was captured.

16. The personal communication device of claim 11, wherein the retrieved group of local data for a geo-tagged image of the plurality of geo-tagged images comprises information on local attractions corresponding to the set of tagged GPS coordinates of the geo-tagged image.

17. The personal communication device of claim 11, wherein the set of steps, as performed by the plurality of software modules, further comprises:
storing the second set of metadata for a geo-tagged image of the plurality of geo-tagged images into an image-metadata database as image metadata attached to the original image of the geo-tagged image.

18. The personal communication device of claim 11, wherein the personal communication device includes the image capturing device.

* * * * *